United States Patent
Horii

(10) Patent No.: US 7,570,155 B2
(45) Date of Patent: Aug. 4, 2009

(54) POSITION-BASED PROXIMITY SECURITY SYSTEM FOR PARKED VEHICLE

(75) Inventor: Yasutoshi Horii, Nagoya (JP)

(73) Assignee: Denso Corporation, Kariya (JP)

( * ) Notice: Subject to any disclaimer, the term of this patent is extended or adjusted under 35 U.S.C. 154(b) by 421 days.

(21) Appl. No.: 11/700,568

(22) Filed: Jan. 31, 2007

(65) Prior Publication Data
US 2007/0182526 A1 Aug. 9, 2007

(30) Foreign Application Priority Data
Feb. 6, 2006 (JP) .............................. 2006-028649

(51) Int. Cl.
B60R 25/10 (2006.01)
B60Q 1/00 (2006.01)
G08G 1/123 (2006.01)
G08B 21/00 (2006.01)

(52) U.S. Cl. ............... 340/426.1; 340/435; 340/426.19; 340/988; 340/686.6

(58) Field of Classification Search ...... 340/426.11–36, 340/463, 436, 541, 435
See application file for complete search history.

(56) References Cited

U.S. PATENT DOCUMENTS

| | | | | |
|---|---|---|---|---|
| 4,845,464 A | * | 7/1989 | Drori et al. ................. | 340/429 |
| 5,315,285 A | * | 5/1994 | Nykerk ................... | 340/426.23 |
| 5,334,969 A | * | 8/1994 | Abe et al. .............. | 340/426.26 |
| 6,956,467 B1 | * | 10/2005 | Mercado, Jr. ............ | 340/426.2 |
| 2004/0075539 A1 | * | 4/2004 | Savoie et al. ............. | 340/426.1 |
| 2006/0187009 A1 | * | 8/2006 | Kropinski et al. ........... | 340/435 |

FOREIGN PATENT DOCUMENTS

| | | |
|---|---|---|
| JP | 2001-171452 | 6/2001 |
| JP | 2003-054370 | 2/2003 |
| JP | 2005161996 | * 6/2005 |

* cited by examiner

*Primary Examiner*—Benjamin C Lee
*Assistant Examiner*—Michael Shannon
(74) *Attorney, Agent, or Firm*—Harness, Dickey & Pierce, PLC

(57) ABSTRACT

A security system includes a position detecting device, a sensing device, and a notifying device. The position detecting device detects a position of a vehicle. The sensing device senses a moving object that moves around the vehicle. The sensing device is mounted in the vehicle. The notifying device provides a notification when the position of the vehicle, which is detected by the position detecting device, indicates that the vehicle is parked at a predetermined position, and when the sensing means senses that the moving object is located in a predetermined range from the vehicle.

5 Claims, 2 Drawing Sheets

POSITION-BASED PROXIMITY SECURITY SYSTEM FOR PARKED VEHICLE

CROSS REFERENCE TO RELATED APPLICATION

This application is based on and incorporates herein by reference Japanese Patent Application No. 2006-28649 filed on Feb. 6, 2006.

BACKGROUND OF THE INVENTION

1. Field of the Invention

The present invention relates to a security system for a vehicle.

2. Description of Related Art

Recently, a vehicular theft has increased. To take measures against the vehicular theft, an anti-theft device is installed in a vehicle. The anti-theft device or an anti-theft method is disclosed in, for example, JP2003-54370A and JP2001-171452A.

A vehicular anti-theft method, which includes an intrusion sensing process, a confirmation process, a warning process, a report communication process, and a tracking process, is disclosed in JP2003-54370A. More specifically about the vehicular anti-theft method, the intrusion sensing process turns on when the vehicle is intruded into, after a vehicular door or a vehicular window is contacted, and provides vehicular theft information. The confirmation process has an owner of a mobile phone confirm the vehicular theft information. The warning process warns via a transmission-reception device of a vehicular anti-theft device. The report communication process transmits a voice and an image at a theft scene, which have been loaded into the mobile phone. The tracking process reports movement position information about the vehicle when the vehicle is stolen.

A vehicular warning device that includes an approach sensing means, a lighting unit, and a control means, wherein the approach sensing means is incorporated into a rearview mirror, is disclosed in JP2001-171452A. More specifically, the approach sensing means senses whether a sensed object is approaching a vehicle body. The lighting unit has a light-emitting diode inside as a light source. The control means controls lighting of the light-emitting diode when the approach sensing means senses a state of the sensed object approaching the vehicle body.

Additionally, the vehicular theft occurs if the owner parks the vehicle in a parking place in his/her home or the like. Consequently, a thief's approach to the parking place to steal the vehicle is tantamount to its approach to the owner's house as well, which is adjacent to the parking place. Thus, the owner staying in the home is at potential risk for his/her security. The parking place, in particular, where the vehicle is parked, faces a road, so that it is often used as the thief's approaching route to the house of the vehicle's owner.

SUMMARY OF THE INVENTION

The present invention addresses the above disadvantages. Thus, it is an objective to provide a security system.

To achieve the objective of the present invention, there is provided a security system, which includes a position detecting means, a sensing means, and a notifying means. The position detecting means detects a position of a vehicle. The sensing means senses a moving object that moves around the vehicle. The sensing means is mounted in the vehicle. The notifying means provides a notification when the position of the vehicle, which is detected by the position detecting means, indicates that the vehicle is parked at a predetermined position, and when the sensing means senses that the moving object is located in a predetermined range from the vehicle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

The present invention will be described using specific embodiments below.

FIRST EMBODIMENT

Figure 1:
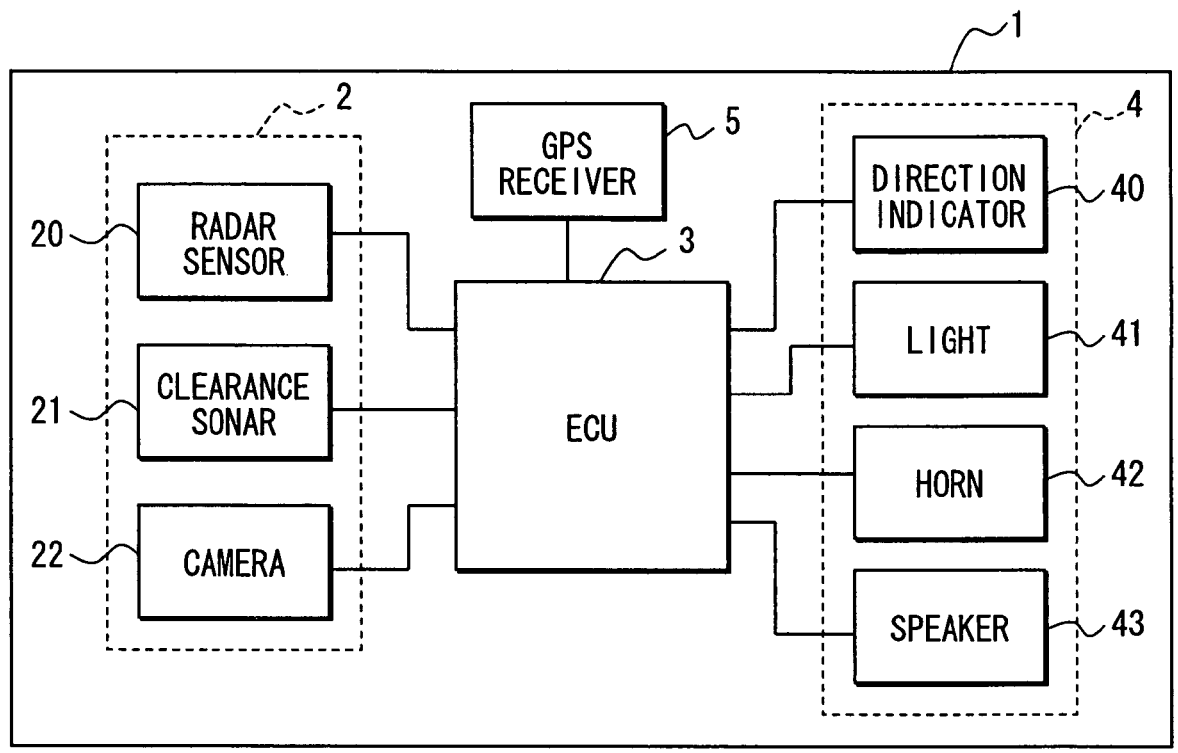
FIG. 1 is a block diagram showing a construction of a security system according to a first embodiment of the present invention.

A vehicle 1, in which a security system of the present embodiment is installed, includes a sensor apparatus 2, an ECU 3, a warning apparatus 4, and a GPS receiver 5. A construction of the vehicle 1 is shown in FIG. 1.

The sensor apparatus 2 assesses a state of an outside of the vehicle 1, and senses a moving object that moves outside the vehicle 1. In the present embodiment, the sensor apparatus 2 includes a radar sensor 20, a clearance sonar 21, and a camera 22. However, it should be noted that the types and the number of the sensors are not limited to the above ones. Specifically, as long as the sensors can sense the moving object, the types and the number of the sensors may be changed in an appropriate manner. The radar sensor 20, which is installed in the vehicle 1, senses, for example, a distance between the vehicle 1 and another vehicle driving ahead of the vehicle 1. The clearance sonar 21 senses a gap between the vehicle 1 and an obstruction outside the vehicle 1. The camera 22 takes an image of the outside of the vehicle 1. Preexisting sensors, which are conventionally installed in a vehicle, can be employed as the sensors of the sensor apparatus 2. Thus, new devices do not need to be installed in the vehicle 1 for the sake of the present embodiment. Accordingly, the security system can be constructed at a lower cost.

Based on a detection signal from the sensor apparatus 2, the ECU 3 determines whether the moving object that moves outside the vehicle 1 is approaching the vehicle 1 as well as a parking position (a parking place) of the vehicle. If the ECU 3 determines that the moving object is approaching, the ECU 3 actuates the warning apparatus 4.

The warning apparatus 4 generates a warning signal based on a command from the ECU 3. Moreover, the warning apparatus 4 can vary the warning signal according to the command from the ECU 3. In the present embodiment, the warning apparatus 4 includes a direction indicator 40 that is installed in the vehicle 1, a light 41 (e.g., a headlight), which illuminates the outside of the vehicle 1, a horn 42 that generates a warning sound toward the outside of the vehicle 1, and a speaker 43 of an acoustic device in the vehicle interior. However, it should be noted that the types and the number of the warning devices are not limited to the above ones. Specifically, as long as the warning devices installed in the vehicle 1 can generate the warning signal (which indicates the sensing of the moving object) against the moving object, the types and the number of the warning devices may be changed in an appropriate manner. Preexisting warning devices, which are conventionally installed in a vehicle, can be employed as the warning devices of the warning apparatus 4. Thus, new devices do not need to be installed in the vehicle 1 for the sake of the present embodiment. Consequently, the security system can be constructed at a lower cost.

The GPS receiver 5, which is installed in the vehicle, receives radio waves from GPS satellites or the like, and estimates a position of the vehicle 1 based on the radio waves received. Then, the GPS receiver 5 transmits positional information estimated about the vehicle to the ECU 3. A device conventionally installed in the vehicle can be employed as the GPS receiver 5. New devices do not need to be installed in the vehicle 1 for the sake of the present embodiment. As a result, the security system can be constructed at a lower cost.

Next, an operation of the security system, which is implemented in the vehicle 1, will be described below.

The vehicle 1 is parked in a predetermined parking position P, which faces a road. Meanwhile, the GPS receiver 5 transmits a signal, which indicates that the vehicle 1 is located in the predetermined parking position P, to the ECU 3. In response to the signal, the ECU 3 determines that the vehicle 1 is parked in the parking position P.

Subsequently, the security system of the present invention is actuated. A method for actuating the security system is not particularly limited. For example, any one of the following methods may be employed in actuating the system. That is, the system may be actuated by a driver of the vehicle 1. It may also be actuated when a predetermined amount of time elapses after the vehicle 1 is parked in the parking position P. Also, it may be actuated after it is determined that a vehicular door is locked while the vehicle 1 is parked in the parking position P. Furthermore, it may be actuated after the driver with a smart key leaves the vehicle 1.

After the security system is actuated, the sensor apparatus 2 observes surroundings of the vehicle. In a case where the sensor apparatus 2 includes the radar sensor 20 and/or the clearance sonar 21, the sensor apparatus 2 senses an object on the road by applying radar waves to the outside (particularly, the road which the parking position faces) of the vehicle, and also senses a movement (a movement speed and/or a moving direction) of the object by observing the object. If the camera 22 is employed for the sensor apparatus 2, the camera 22 senses the movement (the movement speed and/or the moving direction) of the object on the road by observing the object as well as sensing the object by taking the image of the outside (particularly, in a direction of the road) of the vehicle. In addition, an observation of the surroundings by the sensor apparatus 2 may be carried out by a method, whereby the surroundings are continuously observed, or whereby the object (the moving object) on the road is observed after it is sensed by observing the surroundings at predetermined time intervals.

Then, when the ECU 3 senses the object (the moving object) approaching the vehicle (and the parking position P) outside the vehicle based on the input signal supplied from the sensor apparatus 2 to the ECU 3, the ECU 3 actuates the warning apparatus 4. In a case where the warning apparatus 4 includes the direction indicator 40 and/or the light 41, the warning apparatus 4 warns the moving object that the security system has recognized the moving object by lighting them up. Meanwhile, it is preferable that the warning apparatus 4 should emit light particularly to the moving object. Besides, in a case where the warning apparatus 4 includes the horn 42 and/or the speaker 43, the warning apparatus 4 informs the approaching moving object that the security system has recognized the moving object by generating a predetermined sound.

In the meantime, the ECU 3 calculates a distance between the moving object and the vehicle, and controls the warning apparatus 4 to generate the warning signal in accordance with the distance from the moving object. In the case where the warning apparatus 4 includes the direction indicator 40 and/or the light 41, the warning apparatus 4 can generate the warning signal according to the distance by shortening a blinking interval as the moving object keeps approaching. Furthermore, in a case where the light 41, which is equipped with a leveling function and/or a swivel feature, is employed as the warning apparatus 4, it is preferable that the ECU 3 should control a light axis to emit the light toward the moving object. In the case where the warning apparatus 4 includes the horn 42 and/or the speaker 43, the warning apparatus 4 can generate the warning signal according to the distance by changing a pattern of the sound generated, or by turning up the volume of the sound. Moreover, in this case, it is preferable that the warning apparatus 4 should generate a louder sound as the distance from the approaching moving object becomes shorter. Additionally, if the speaker 43 is employed as the warning apparatus 4, it is preferable that the speaker 43 should generate a voice-warning signal against the moving object.

As described above, the security system of the present embodiment allows the vehicle itself to perform the sensing and the reporting of the moving object. In other words, performing the sensing and the reporting of an approaching person by the vehicle saves the need for installation of a new security system near the parking position. Accordingly, the security system that monitors the parking place can be constructed at a lower cost.

Furthermore, because the preexisting sensor apparatus 2, which is preinstalled in the vehicle 1, can be employed in the security system of the present embodiment, there is no need for installation of a new sensor and the like in the vehicle 1.

SECOND EMBODIMENT

Figure 2:
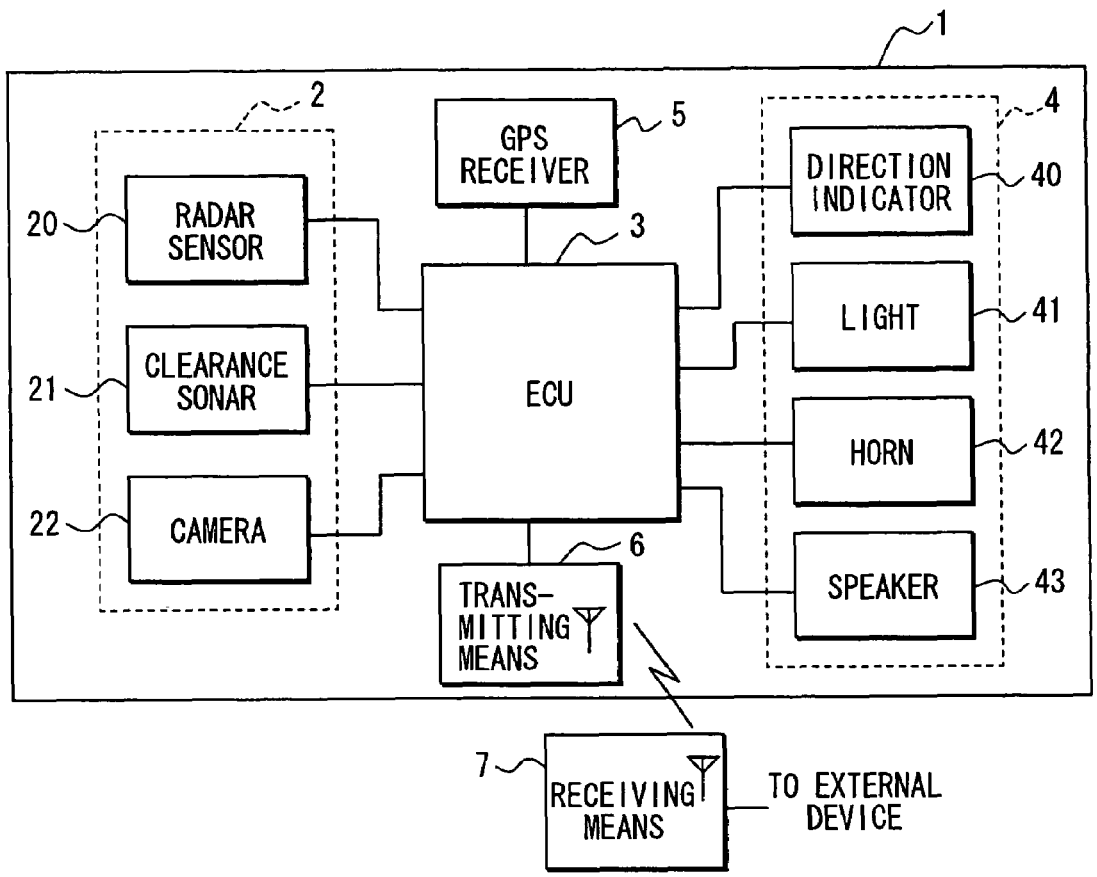
FIG. 2 is a block diagram showing a construction of a security system according to a second embodiment of the present invention.

A security system according to a second embodiment is constructed in such a manner that the vehicle 1 having the security system of the first embodiment further includes a transmitting means 6 (e.g., a wired or wireless radio transmitter) for transmitting information about the moving object, and a receiving means 7 (e.g., a wired or wireless radio receiver) for receiving a signal from the transmitting means 6. The receiving means 7 is installed outside the vehicle 1. A construction of the security system of the present embodiment is shown in FIG. 2.

The transmitting means 6 and the receiving means 7 are not particularly limited to the wired or wireless radio transmitter and the wired or wireless radio receiver, respectively, for example, as long as they can transmit and receive the information about the moving object. Moreover, transmitting and receiving of the information, whether they are performed via wire communication or via wireless communication, are not limited.

The security system of the present embodiment can be operated in the same manner as that of the first embodiment, except that the transmitting means 6 transmits the information to the receiving means 7.

When approaching of the moving object to the vehicle is sensed by the sensor apparatus 2, the security system of the present embodiment transmits sensed information to the receiving means 7 that is installed outside the vehicle 1 using the transmitting means 6. The receiving means 7 inputs into an external device (e.g., a warning device) the information that the moving object, which approaches the vehicle, has been sensed. Accordingly, through the external device, a person (e.g., the driver or an owner of the vehicle) away from the vehicle 1 can recognize the approach of the moving object to the vehicle 1.

Meanwhile, if the camera 22 is employed for the sensor apparatus 2, it is preferable that the camera 22 should transmit the image taken as the sensed information. The receiving means 7 (e.g., a receiver with a monitor) displays the image so that the person (e.g., the driver or the owner of the vehicle) away from the vehicle 1 can confirm the moving object approaching to the vehicle 1. Moreover, storing of the image allows informing police and the like, when an abnormal state is recognized near the vehicle 1.

As in the first embodiment, the security system of the present embodiment allows the vehicle itself to perform the sensing and the reporting of the moving object as described above. That is, the performing of the sensing and the reporting of the approaching person by the vehicle saves the need for the installation of the new security system near the parking position. Consequently, the security system, which monitors the parking place, can be constructed at a lower cost.

In addition, the security system of the present embodiment can provide a warning of the approach of the moving object, to the outside of the vehicle 1 and eventually to the person away from the vehicle 1. The confirmation of the moving object by the person may enhance security.

THIRD EMBODIMENT

Figure 3:
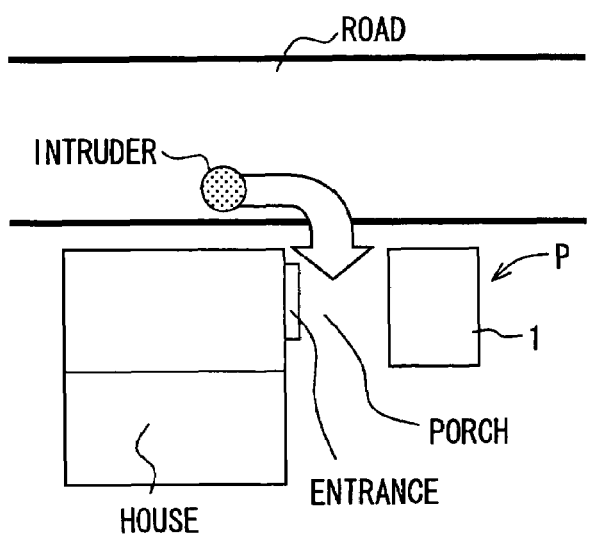
FIG. 3 is a schematic plan view showing a house and its premises in which a security system is installed according to a third embodiment of the present invention.

A security system according to a third embodiment is constructed, such that the receiving means 7 in the security system of the second embodiment is installed in a home security system that secures a house and its premises in which the parking position P is located. The parking position P faces the road, which runs alongside the house and its premises. In addition, a porch, through which an entrance (e.g., a gate) to the premises communicates with the house, is generally located next to the parking position P. The house and its premises, in which the security system of the present embodiment is installed, are shown in FIG. 3.

The home security system that monitors the house and its premises can be realized by employing a conventionally known system.

When the security system of the present embodiment is actuated, the sensor apparatus 2 observes surroundings (especially, the road that the parking position P faces and the porch adjacent to the parking position P) of the vehicle. An actuation of the security system of the present embodiment can be performed on the moving object (an intruder) that moves down the road, in the same manner as that of each one of the above embodiments.

Moreover, as the porch is located on the premises, it is preferable that the warning apparatus 4 should generate the warning signal (turn up the volume of the sound generated by the horn 42 and/or the speaker 43) against the moving object that moves across the porch so that a greater impact can be made on it.

Similar to the first embodiment, the security system of the present embodiment allows the vehicle itself to perform the sensing and the reporting of the moving object as described above. That is, the performing the sensing and the reporting of the approaching person by the vehicle saves the need for the installation of the new security system near the parking position. As a result, the security system that secures the adjacencies to the parking place can be constructed at a lower cost.

Besides, the security system of the present embodiment can warn the outside of the vehicle 1, and eventually the person away from the vehicle 1, of the approach of the moving object. The confirmation of the moving object by the person may enhance security.

In the present embodiment, the security system which is installed in the vehicle 1, is included in the home security system, thereby allowing monitoring without adding the new sensor and the like near the parking position P. Consequently, the home security system can be constructed at a lower cost.

MODIFICATION TO THIRD EMBODIMENT

The third embodiment may be modified as follows. The vehicle 1 may be implemented as an electric vehicle, and the transmitting means 6 and the receiving means 7 may be employed as charging means (charging devices) for charging the electric vehicle. The charging means includes an electric power unit, a conductive wire (e.g., an electric power line), and a connecting means. The electric power unit supplies electric power to the electric vehicle. The electric power provided by the electric power unit passes through the conductive wire. The conductive wire is connected to the connecting means, which is installed in the electric vehicle.

There is an advantage that the electric power to drive the security system can be constantly supplied from the electric power unit, if the vehicle 1 is implemented as the electric vehicle.

The charging of the electric vehicle is performed through connecting the electric power unit and the electric vehicle via the electric power line. The charging of the electric vehicle, whether it is performed in a contact or non-contact manner, is carried out with the electric power line fixed in some way on both (the electric vehicle and the electric power unit) sides. That is, in a state where the electric power line is fixed, a secure electric connection between the electric vehicle and the electric power unit allows communication between the transmitting means 6 and the receiving means 7.

Moreover, if the electric vehicle is constructed such that information can be communicated through the charging device, the electric vehicle can obtain positional information about the electric power unit via the charging means. In other words, the parking position of the electric vehicle can be determined using the positional information about a location in which the electric power unit is placed. The positional information about the electric power unit has higher accuracy than a GPS.

In addition, a start of the charging by the charging means can be synchronized with that of the actuation of the security system.

Additional advantages and modifications will readily occur to those skilled in the art. The invention in its broader terms is therefore not limited to the specific details, representative apparatus, and illustrative examples shown and described.

What is claimed is:

1. A security system comprising:
   a position detecting means for detecting a position of a vehicle;
   a sensing means for sensing a moving object that moves around the vehicle, wherein the sensing means is mounted in the vehicle; and a notifying means for providing a notification upon satisfaction of all of the following conditions:
- the position of the vehicle, which is detected by the position detecting means, indicates that the vehicle is parked at a predetermined position; and
- the sensing means senses that the moving object is located in a predetermined range from the vehicle.

2. The security system according to claim 1, wherein the notifying means includes a warning means for providing a warning as the notification with respect to the moving object.

3. The security system according to claim 2, wherein the warning means provides the warning, which varies according to a distance between the moving object and the vehicle.

4. The security system according to claim 1, wherein:
- the notifying means includes an external warning means for providing a warning as the notification with respect to the moving object; and
- the external warning means is located outside the vehicle.

5. The security system according to claim 1, wherein:
- the predetermined position is located in a parking place that faces a vehicular road; and
- the sensing means senses the moving object, which is on the vehicular road and approaches the vehicle.

* * * * *